United States Patent
Boulanger et al.

(10) Patent No.: US 9,143,703 B2
(45) Date of Patent: Sep. 22, 2015

(54) INFRARED CAMERA CALIBRATION TECHNIQUES

(75) Inventors: Pierre Boulanger, Goleta, CA (US); Theodore R. Hoelter, Goleta, CA (US); Barbara Sharp, Santa Barbara, CA (US); Eric A. Kurth, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 541 days.

(21) Appl. No.: 13/491,428

(22) Filed: Jun. 7, 2012

(65) Prior Publication Data

US 2012/0312976 A1 Dec. 13, 2012

Related U.S. Application Data

(60) Provisional application No. 61/495,873, filed on Jun. 10, 2011, provisional application No. 61/495,879, filed on Jun. 10, 2011, provisional application No. 61/495,888, filed on Jun. 10, 2011.

(51) Int. Cl.

| | |
|---|---|
| *H04N 5/33* | (2006.01) |
| *G01J 5/52* | (2006.01) |
| *H04N 5/225* | (2006.01) |
| *G01J 5/20* | (2006.01) |
| *G01J 5/02* | (2006.01) |
| *G01J 5/00* | (2006.01) |

(52) U.S. Cl.
CPC . *H04N 5/33* (2013.01); *G01J 5/522* (2013.01); *H04N 5/2257* (2013.01); *G01J 5/00* (2013.01); *G01J 5/02* (2013.01); *G01J 5/20* (2013.01)

(58) Field of Classification Search
CPC ............... G01J 5/20; G01J 5/00; G01J 5/02; G01J 5/522; H04N 5/33; H04N 5/2257
See application file for complete search history.

(56) References Cited

U.S. PATENT DOCUMENTS

| | | | |
|---|---|---|---|
| 2,764,055 A | 9/1956 | Clemens at al. | |
| 5,420,421 A * | 5/1995 | Lindgren et al. | 250/252.1 |
| 6,215,323 B1 * | 4/2001 | Rennies et al. | 324/750.08 |
| 6,297,794 B1 | 10/2001 | Tsubouchi et al. | |
| 6,330,371 B1 | 12/2001 | Chen et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,633,231 B1 | 10/2003 | Okamoto et al. | |
| 6,681,120 B1 | 1/2004 | Kim | |
| 6,883,054 B2 | 4/2005 | Yamaguchi et al. | |

(Continued)

FOREIGN PATENT DOCUMENTS

| | | |
|---|---|---|
| CN | 2874947 | 2/2007 |
| CN | 2899321 | 5/2007 |

(Continued)

*Primary Examiner* — Yara B Green
(74) *Attorney, Agent, or Firm* — Haynes and Boone, LLP

(57) ABSTRACT

Various techniques are disclosed for testing and/or calibrating infrared imaging modules. For example, a method of calibrating an infrared imaging module may include providing a plurality of temperature controlled environments. The method may also include transporting the infrared imaging module through the environments. The method may also include performing a measurement in each environment using an infrared sensor assembly of the infrared imaging module and determining a plurality of calibration values for the infrared imaging module based on the measurements.

17 Claims, 23 Drawing Sheets

(56) References Cited

U.S. PATENT DOCUMENTS

| | | | |
|---|---|---|---|
| 6,984,825 B2 * | 1/2006 | Shelley et al. | 250/339.11 |
| 7,050,107 B1 | 5/2006 | Frank et al. | |
| D524,785 S | 7/2006 | Huang | |
| 7,084,857 B2 | 8/2006 | Lieberman et al. | |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,377,835 B2 | 5/2008 | Parkulo et al. | |
| 7,453,064 B2 | 11/2008 | Lee | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,616,877 B2 * | 11/2009 | Zarnowski et al. | 396/85 |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 7,960,700 B2 | 6/2011 | Craig et al. | |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,537,343 B2 | 9/2013 | Zhang | |
| 2002/0006337 A1 | 1/2002 | Kimura et al. | |
| 2002/0122036 A1 | 9/2002 | Sasaki | |
| 2002/0135571 A1 | 9/2002 | Klocek et al. | |
| 2002/0149600 A1 | 10/2002 | Van Splunter et al. | |
| 2003/0007193 A1 | 1/2003 | Sato et al. | |
| 2003/0112871 A1 | 6/2003 | Demos | |
| 2003/0122957 A1 | 7/2003 | Emme | |
| 2003/0223623 A1 | 12/2003 | Gutta et al. | |
| 2004/0047518 A1 | 3/2004 | Tiana | |
| 2004/0101298 A1 | 5/2004 | Mandelbaum et al. | |
| 2004/0127156 A1 | 7/2004 | Park | |
| 2004/0128070 A1 | 7/2004 | Schmidt et al. | |
| 2004/0157612 A1 | 8/2004 | Kim | |
| 2004/0165788 A1 | 8/2004 | Perez et al. | |
| 2004/0169860 A1 | 9/2004 | Jung et al. | |
| 2004/0207036 A1 | 10/2004 | Ikeda | |
| 2004/0256561 A1 | 12/2004 | Beuhler et al. | |
| 2005/0030314 A1 | 2/2005 | Dawson | |
| 2005/0067852 A1 | 3/2005 | Jeong | |
| 2005/0068333 A1 | 3/2005 | Nakahashi et al. | |
| 2005/0089241 A1 | 4/2005 | Kawanishi et al. | |
| 2005/0093890 A1 | 5/2005 | Baudisch | |
| 2005/0110803 A1 | 5/2005 | Sugimura | |
| 2005/0138569 A1 | 6/2005 | Baxter et al. | |
| 2005/0169655 A1 | 8/2005 | Koyama et al. | |
| 2005/0184993 A1 | 8/2005 | Ludwin et al. | |
| 2005/0213813 A1 | 9/2005 | Lin et al. | |
| 2005/0213853 A1 | 9/2005 | Maier et al. | |
| 2005/0219249 A1 | 10/2005 | Xie et al. | |
| 2005/0248912 A1 | 11/2005 | Kang et al. | |
| 2005/0265688 A1 | 12/2005 | Kobayashi | |
| 2005/0270784 A1 | 12/2005 | Hahn et al. | |
| 2005/0277447 A1 | 12/2005 | Buil et al. | |
| 2006/0039686 A1 | 2/2006 | Soh et al. | |
| 2006/0060984 A1 | 3/2006 | Wakabayashi et al. | |
| 2006/0077246 A1 | 4/2006 | Kawakami et al. | |
| 2006/0097172 A1 | 5/2006 | Park | |
| 2006/0120712 A1 | 6/2006 | Kim | |
| 2006/0132642 A1 | 6/2006 | Hosaka et al. | |
| 2006/0140501 A1 | 6/2006 | Tadas | |
| 2006/0147191 A1 | 7/2006 | Kim | |
| 2006/0154559 A1 | 7/2006 | Yoshida | |
| 2006/0210249 A1 | 9/2006 | Seto | |
| 2006/0234744 A1 | 10/2006 | Sung et al. | |
| 2006/0240867 A1 | 10/2006 | Wang et al. | |
| 2006/0279758 A1 | 12/2006 | Myoki | |
| 2006/0285907 A1 | 12/2006 | Kang et al. | |
| 2007/0019077 A1 | 1/2007 | Park | |
| 2007/0019099 A1 | 1/2007 | Lieberman et al. | |
| 2007/0019103 A1 | 1/2007 | Lieberman et al. | |
| 2007/0033309 A1 | 2/2007 | Kuwabara et al. | |
| 2007/0034800 A1 | 2/2007 | Huang | |
| 2007/0052616 A1 | 3/2007 | Yoon | |
| 2007/0057764 A1 | 3/2007 | Sato et al. | |
| 2007/0103479 A1 | 5/2007 | Kim et al. | |
| 2007/0120879 A1 | 5/2007 | Kanade et al. | |
| 2007/0132858 A1 | 6/2007 | Chiba et al. | |
| 2007/0139739 A1 | 6/2007 | Kim et al. | |
| 2007/0159524 A1 | 7/2007 | Kim et al. | |
| 2007/0189583 A1 | 8/2007 | Shimada et al. | |
| 2007/0211965 A1 | 9/2007 | Helbing et al. | |
| 2007/0222798 A1 | 9/2007 | Kuno | |
| 2007/0248284 A1 | 10/2007 | Bernsen et al. | |
| 2007/0274541 A1 | 11/2007 | Uetake et al. | |
| 2007/0285439 A1 | 12/2007 | King et al. | |
| 2007/0286517 A1 | 12/2007 | Paik et al. | |
| 2007/0299226 A1 | 12/2007 | Park et al. | |
| 2008/0038579 A1 | 2/2008 | Schuisky et al. | |
| 2008/0056612 A1 | 3/2008 | Park et al. | |
| 2008/0079834 A1 | 4/2008 | Chung et al. | |
| 2008/0112012 A1 | 5/2008 | Yokoyama et al. | |
| 2008/0151056 A1 | 6/2008 | Ahamefula | |
| 2008/0165190 A1 | 7/2008 | Min et al. | |
| 2008/0165342 A1 | 7/2008 | Yoshida et al. | |
| 2008/0170082 A1 | 7/2008 | Kim | |
| 2008/0218474 A1 | 9/2008 | Ahn et al. | |
| 2008/0248833 A1 | 10/2008 | Silverbrook et al. | |
| 2008/0259181 A1 | 10/2008 | Yamashita et al. | |
| 2008/0266079 A1 | 10/2008 | Lontka | |
| 2008/0278772 A1 | 11/2008 | Silverbrook et al. | |
| 2008/0284880 A1 | 11/2008 | Numata | |
| 2008/0292144 A1 | 11/2008 | Kim | |
| 2008/0297614 A1 | 12/2008 | Lieberman et al. | |
| 2009/0023421 A1 | 1/2009 | Parkulo et al. | |
| 2009/0027525 A1 | 1/2009 | Lin et al. | |
| 2009/0040042 A1 | 2/2009 | Lontka | |
| 2009/0040195 A1 | 2/2009 | Njolstad et al. | |
| 2009/0052883 A1 | 2/2009 | Lee et al. | |
| 2009/0129700 A1 | 5/2009 | Rother et al. | |
| 2009/0131104 A1 | 5/2009 | Yoon | |
| 2009/0148019 A1 | 6/2009 | Hamada et al. | |
| 2009/0213110 A1 | 8/2009 | Kato et al. | |
| 2009/0215479 A1 | 8/2009 | Karmarkar | |
| 2009/0227287 A1 | 9/2009 | Kotidis | |
| 2009/0238238 A1 | 9/2009 | Hollander et al. | |
| 2009/0278048 A1 | 11/2009 | Choe et al. | |
| 2009/0297062 A1 | 12/2009 | Molne et al. | |
| 2010/0020229 A1 | 1/2010 | Hershey et al. | |
| 2010/0066866 A1 | 3/2010 | Lim | |
| 2010/0090983 A1 | 4/2010 | Challener et al. | |
| 2010/0103141 A1 | 4/2010 | Challener et al. | |
| 2010/0113068 A1 | 5/2010 | Rothschild | |
| 2010/0131268 A1 | 5/2010 | Moeller | |
| 2010/0144387 A1 | 6/2010 | Chou | |
| 2010/0163730 A1 | 7/2010 | Schmidt et al. | |
| 2010/0234067 A1 | 9/2010 | Silverbrook et al. | |
| 2010/0245582 A1 | 9/2010 | Harel | |
| 2010/0245585 A1 | 9/2010 | Fisher et al. | |
| 2010/0245826 A1 | 9/2010 | Lee | |
| 2010/0314543 A1 | 12/2010 | Lee et al. | |
| 2011/0043486 A1 | 2/2011 | Hagiwara et al. | |
| 2011/0063446 A1 | 3/2011 | McMordie et al. | |
| 2011/0102599 A1 | 5/2011 | Kwon et al. | |
| 2011/0117532 A1 | 5/2011 | Relyea et al. | |
| 2011/0121978 A1 | 5/2011 | Schwörer et al. | |

(56) References Cited

U.S. PATENT DOCUMENTS

| | | |
|---|---|---|
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2013/0204570 A1 | 8/2013 | Mendelson et al. |

FOREIGN PATENT DOCUMENTS

| | | |
|---|---|---|
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102055836 | 5/2011 |
| CN | 201897853 | 7/2011 |
| CN | 102178510 | 9/2011 |
| CN | 102880289 | 1/2013 |
| CN | 202998279 | 6/2013 |
| EP | 1983485 | 10/2008 |
| EP | 2136554 | 12/2009 |
| EP | 2477391 | 7/2012 |
| JP | 1997275518 | 4/1999 |
| JP | 2004/004465 | 1/2004 |
| JP | 2004048571 | 2/2004 |
| JP | 2006098098 | 4/2006 |
| JP | 2006105655 | 4/2006 |
| JP | 2007006475 | 1/2007 |
| JP | 2007/267035 | 10/2007 |
| JP | 2007325842 | 12/2007 |
| JP | 2010181324 | 8/2010 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 20070028201 | 3/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |

(56) References Cited

FOREIGN PATENT DOCUMENTS

| | | |
|---|---|---|
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |

\* cited by examiner

INFRARED CAMERA CALIBRATION TECHNIQUES

CROSS-REFERENCE TO RELATED APPLICATIONS

This application also claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

This application also claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

This application also claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the invention relate generally to imaging devices and more particularly, for example, to infrared imaging devices.

BACKGROUND

Existing infrared imaging devices, such as infrared cameras, are often tested for performance and to perform calibration under different conditions. Typically, such testing involves placing the infrared imaging devices in a stationary, fixed environment and slowly varying the test conditions of the environment over periods of time.

Such testing may take extended periods of time as environmental conditions such as temperature are changed and the infrared imaging devices slowly change in response thereto until a final steady state is reached. Such time constraints can significantly limit the number of infrared imaging devices that may be tested and thus manufactured. In particular, such limitations can impede the ability to mass produce large numbers of infrared imaging devices.

Accordingly, there is a need for an improved approach to infrared imaging device testing that more easily permits mass production of such devices.

SUMMARY

Various techniques are disclosed for testing and/or calibrating infrared imaging modules. In various embodiments, measurements may be taken using infrared imaging modules as they pass through a variety of temperature controlled environments. For example, the environments may be maintained at sufficiently high and low temperatures such that the temperatures of the infrared imaging modules may rapidly change (e.g., slew) to desired measurement temperatures which may be significantly lower or higher than that of some of the temperature controlled environments. Such techniques may be used, for example, to permit large numbers of infrared imaging modules to be tested and calibrated when mass produced.

In one embodiment, a method of calibrating an infrared imaging module includes providing a plurality of temperature controlled environments; inserting the infrared imaging module into a socket; transporting the infrared imaging module through the environments; performing a measurement in each environment using an infrared sensor assembly of the infrared imaging module; and determining a plurality of calibration values for the infrared imaging module based on the measurements.

In another embodiment, an apparatus includes a plurality of partitions adapted to substantially separate a plurality of temperature controlled environments; a conveyor adapted to receive a plurality of infrared imaging modules and transport the infrared imaging modules through the environments; and a test equipment adapted to provide a plurality of test signals to the infrared imaging modules to cause infrared sensor assemblies of the infrared imaging modules to perform at least one measurement in each environment, wherein the measurements are adapted to be used to provide at least one calibration value based on each environment for each infrared imaging module.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5F-P illustrate additional views of infrared imaging modules implemented with several form factors in accordance with various embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
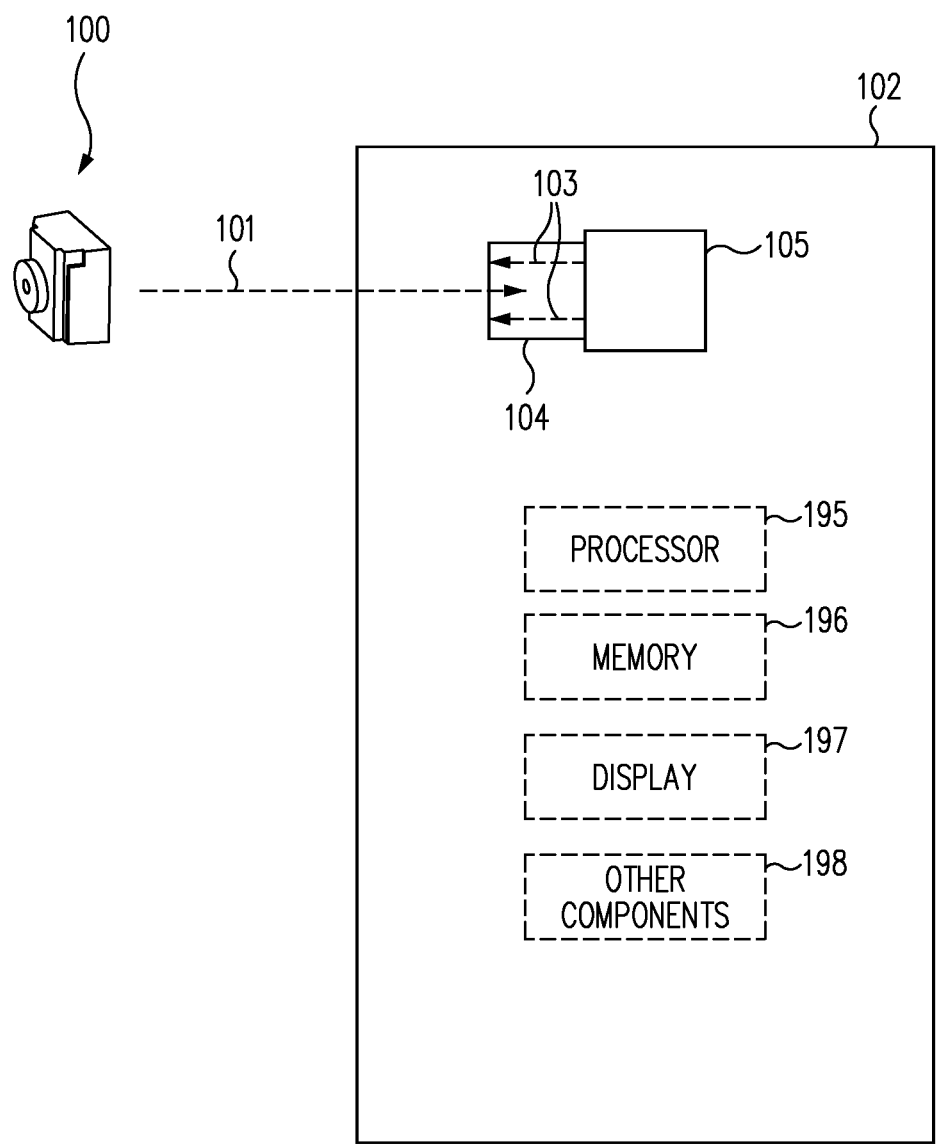
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques along with other novel infrared camera packaging techniques as discussed herein.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated without requiring significant additional measures to compensate for such self heating.

Figure 2:
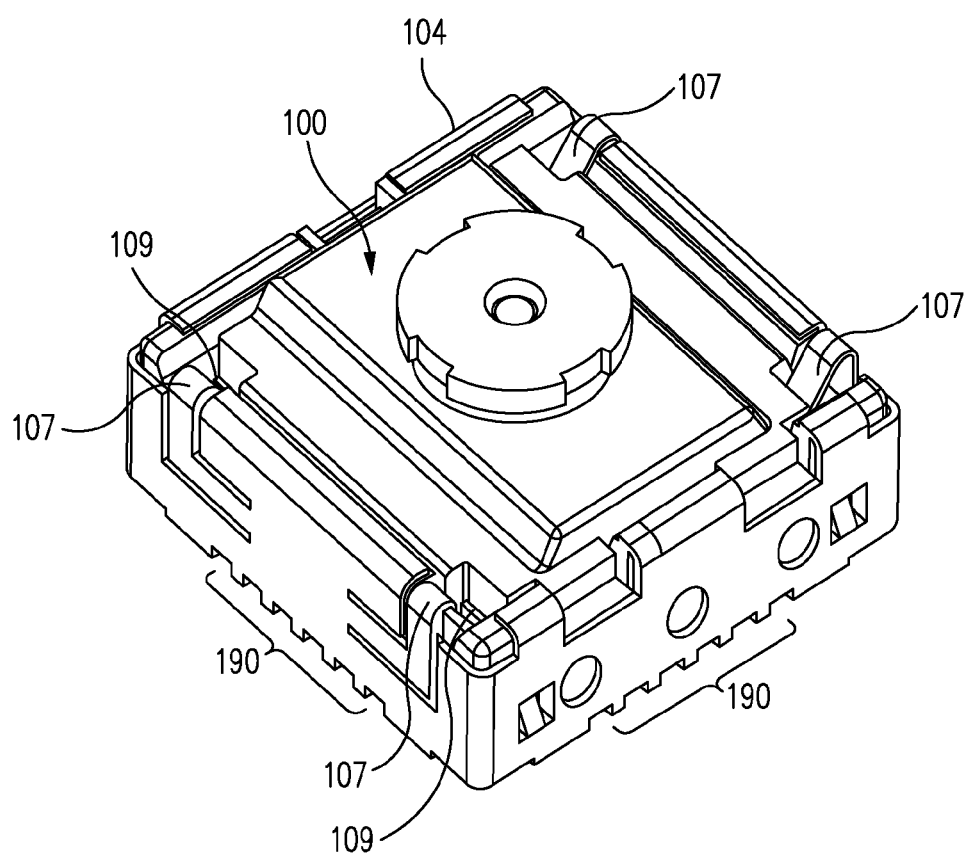
FIG. 2 illustrates an assembled infrared imaging module in accordance with an embodiment of the disclosure.

As shown in FIG. 1, host device 102 may include a socket 104, a shutter 105, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., a visible light camera or other components).

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
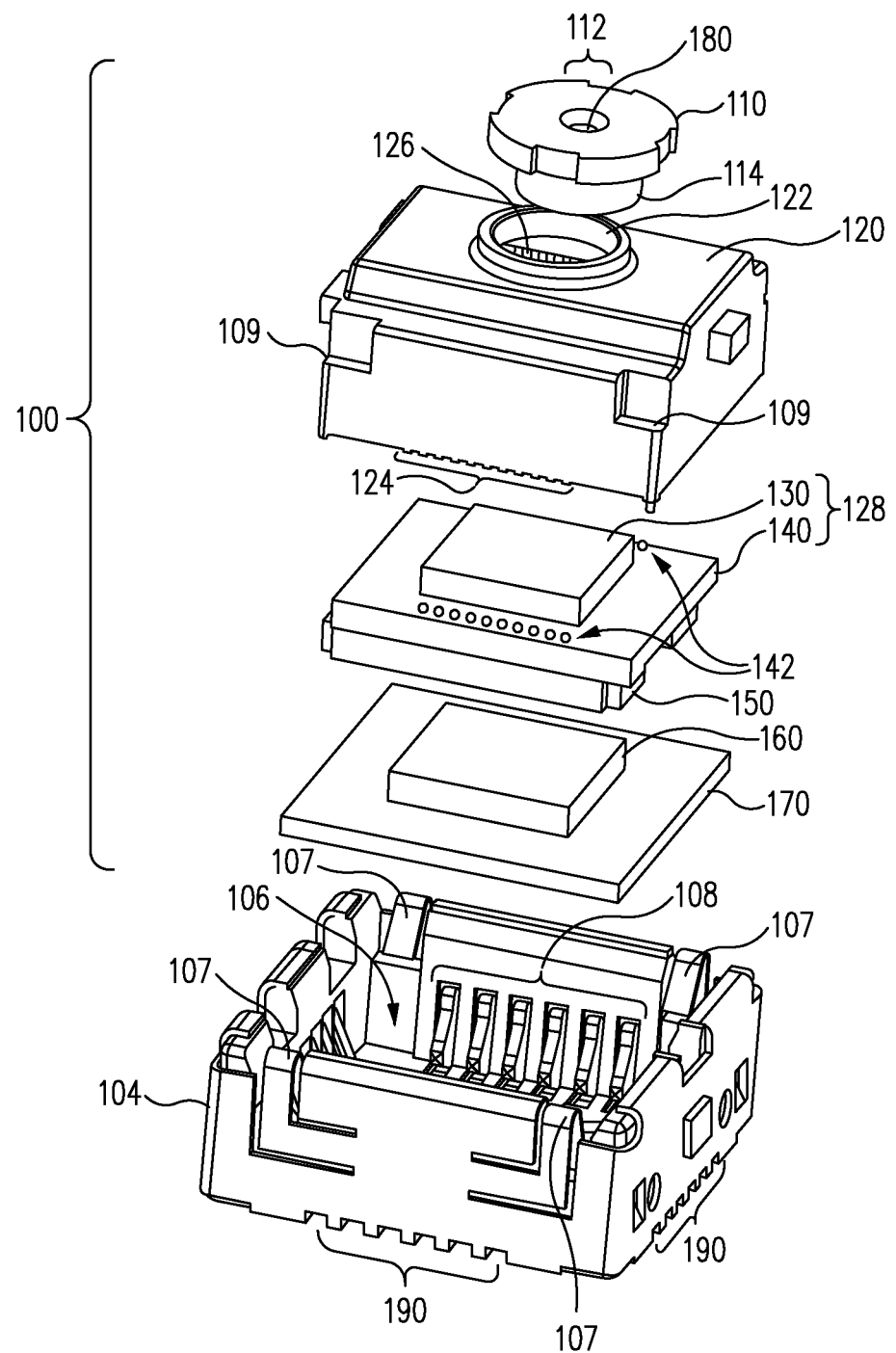
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 which is partially visible in FIG. 3 through an aperture 112 in lens barrel 110. Lens barrel 100 may include a substantially cylindrical extension 114 which may be used to interface lens barrel 100 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130 (e.g., shown in FIGS. 5A-K, 5M-P, and 8). For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWTR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Figure 5A:
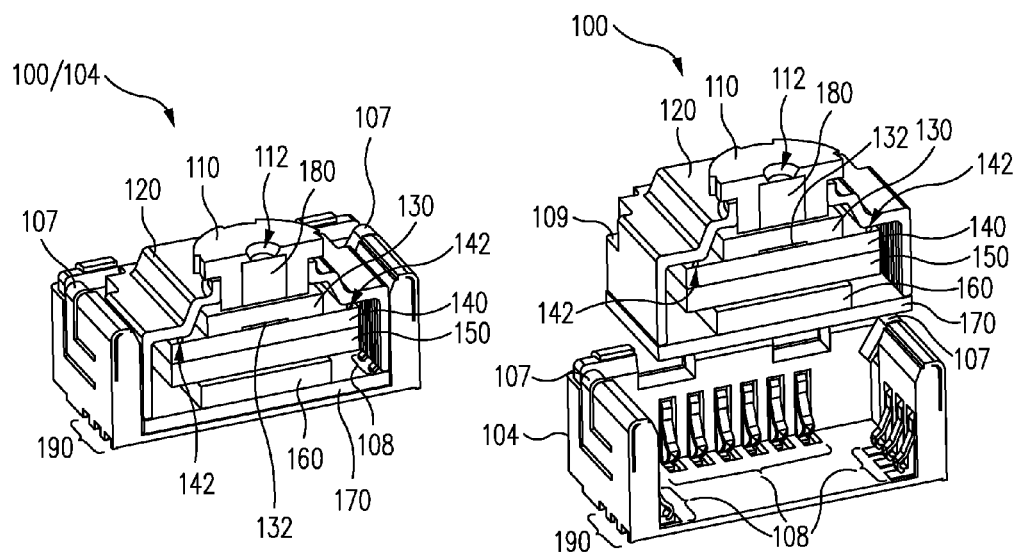
FIGS. 5A-E illustrate cross-sectional views of infrared imaging modules implemented with several form factors in accordance with various embodiments of the disclosure.
Figure 5B:
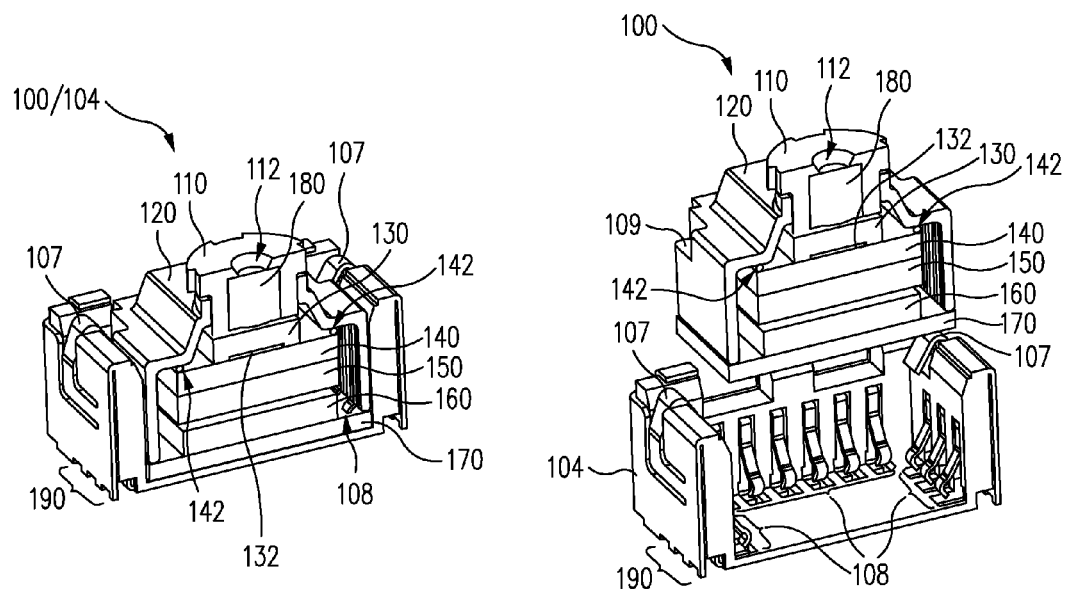
Figure 5C:
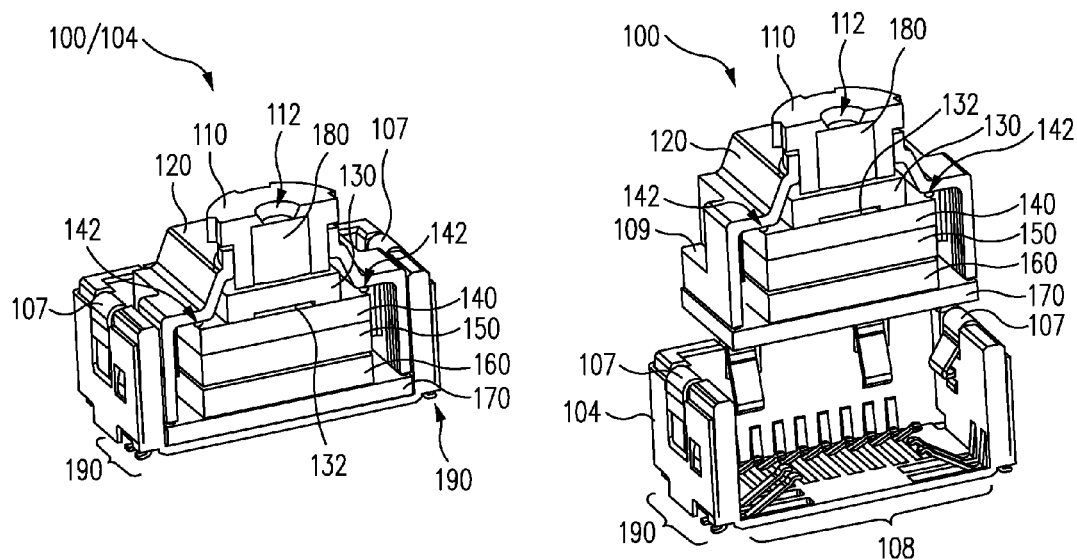

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 as shown in FIGS. 5A-C and FIGS. 5F-I). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. For example, as shown in FIGS. 2-3, 5A-F, 5H, 5J, 5L-M, and 5O-P, socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, as shown in FIGS. 3 and 5A-P, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190 as shown in FIGS. 2-3 and 5A-P. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, in FIGS. 5A-C, 5F-I, and 5L (further described herein), infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Figure 4:
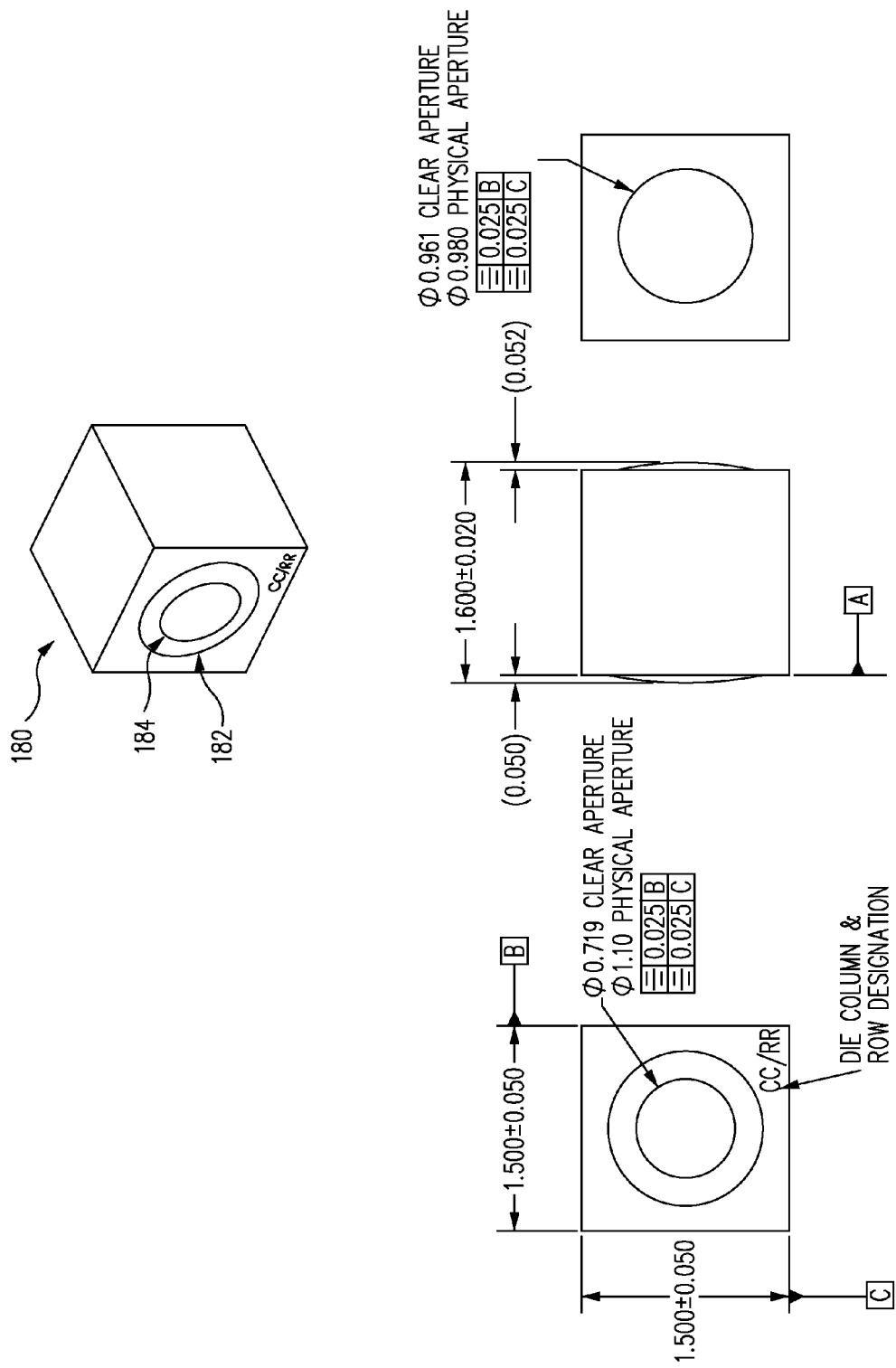
FIG. 4 illustrates an example implementation of an optical element that may be implemented in an infrared imaging module in accordance with an embodiment of the disclosure.

FIG. 4 illustrates an example implementation of optical element 180 that may be implemented in infrared imaging module 100 in accordance with an embodiment of the disclosure. In one embodiment, optical element 180 may be implemented as a silicon etched wafer level single element optic in accordance with various dimensions shown in FIG. 4.

As also shown in FIG. 4, optical element 180 may be implemented substantially as a cube, but with two slightly convex faces on faces providing apertures. For example, optical element 180 may include a physical aperture 182 and a smaller clear aperture 184. Optical element 180 allows through the desired infrared wavelengths to infrared sensor assembly 128.

In one embodiment, optical element 180 may be a single etched wafer level optical element made of silicon with the following specifications: image plane of 0.54 mm by 0.54 mm (e.g., when implemented for an infrared sensor assembly 128 having a 32 by 32 array of infrared sensors 132 with 17 μm pixel pitch); horizontal field of view (FoV) of approximately 55.7 degrees; F/# approximately equal to 0.91; modulated transfer function (MTF) of approximately 0.46 at 29 cy/mm; an anti-reflective coating with less than approximately two percent loss per surface; and focused at infinity.

In some embodiments, optical element 180 may be integrated as part of a wafer level package that includes infrared sensor assembly 128. For example, optical element 180 may be implemented as part of cap 130, stacked on various components of infrared sensor assembly 128 (e.g., with appropriate spacers provided therebetween), or otherwise integrated with various components of infrared sensor assembly 128.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a non-uniformity correction (NUC) process or other calibration processes) for infrared imaging module 100 as would be understood by one skilled in the art.

In various embodiments, shutter 105 may be made from various materials such as, for example, polymers, glass, or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art. Alternatively, in another embodiment, a shutter (e.g., shutter 105 or other type of external or internal shutter) need not be provided, but rather a NUC process or other type of calibration may be performed using shutterless techniques.

FIGS. 5A-E illustrate cross-sectional views of infrared imaging modules 100 implemented with several form factors in accordance with various embodiments of the disclosure. In particular, each of FIGS. 5A-E shows a cross-sectional view of an infrared imaging module 100 while installed in a corresponding socket 104, and another cross-sectional view of the same infrared imaging module 100 but separated from its corresponding socket 104.

It will be appreciated that FIGS. 5A-E show a variety of physical implementations of various components identified in FIGS. 1-4. For example, FIG. 5A shows a physical implementation of infrared imaging module 100 and socket 104 corresponding to the embodiments illustrated in FIGS. 2-3, while FIGS. 5B-E show other examples of physical implementations.

It will also be appreciated that, in FIGS. 5A-C, electrical connections 126 may be provided in housing 120 as discussed to infrared sensor assembly 128 and circuit board 170. In contrast, in FIGS. 5D-E, wire bonds 143 and 145 may be used to connect infrared sensor assembly 128 to processing module 160. In one embodiment, wire bonds 143 and 145 may pass through base 150. In another embodiment, wire bonds 143 and 145 may connect to circuitry in base 150 without passing through base 150. In yet another embodiment, wire bonds 143 and 145 may connect to electrical connections 147 to provide electrical connections between various portions of infrared imaging module 100 to socket 104 and/or host device 102.

In some embodiments, sockets 104 shown in FIGS. 5A-E may be implemented as mobile telephone camera sockets available from, for example, Molex® Incorporated of Lisle, Ill. in accordance with various part numbers identified in Table 1 below. Table 1 further identifies various example aspects of sockets 104 shown in FIGS. 5A-E.

TABLE 1

| | Internal Socket Size L × W (mm) | Socket Type | Part Number | Frame | Board | Overall Package Dimensions L × W × H (mm) | Camera Sub Assembly Dimensions L × W × H (mm) | Sensor Size (mm) | Window Size (mm) | Frame Thickness (mm) |
|---|---|---|---|---|---|---|---|---|---|---|
| FIG. 5A | 8.50 × 8.50 | Side Contact | SD-47337-001 | LDS-MID | PCB | 10.60 × 10.60 × | 8.50 × 8.50 × | 6.5 × 7.5 | 4.0 × 4.0 | 0.300 |

TABLE 1-continued

Figure 5D:
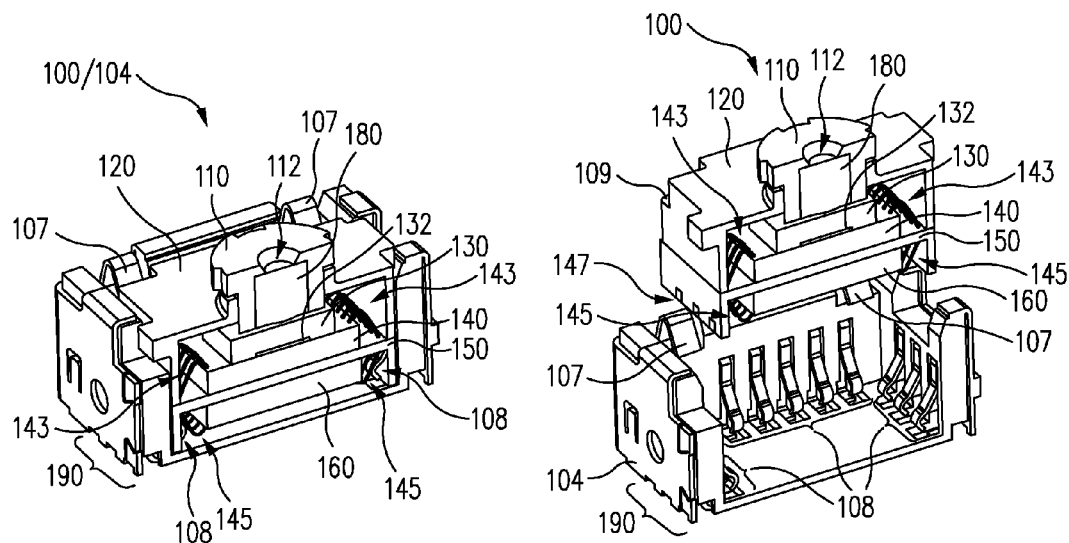
Figure 5E:
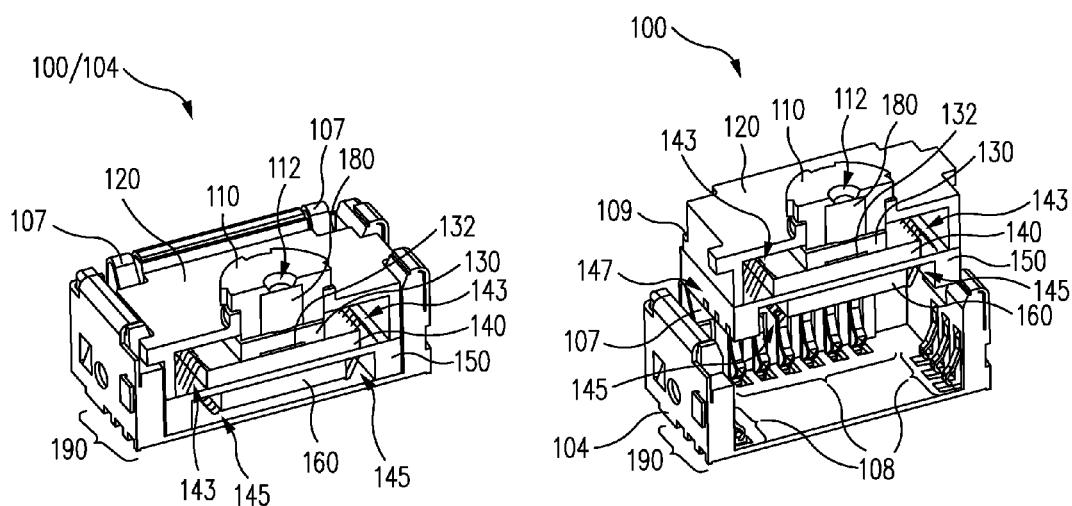

| | Internal Socket Size L × W (mm) | Socket Type | Part Number | Frame | Board | Overall Package Dimensions L × W × H (mm) | Camera Sub Assembly Dimensions L × W × H (mm) | Sensor Size (mm) | Window Size (mm) | Frame Thickness (mm) |
|---|---|---|---|---|---|---|---|---|---|---|
| FIG. 5B | 6.50 × 6.50 | Side Contact | SD-47586-001 | LDS-MID | PCB | 8.60 × 8.60 × 5.90 | 5.65 6.50 × 6.50 × 5.65 | 5.0 × 5.5 | 3.0 × 3.0 | 0.100-0.250 |
| FIG. 5C | 6.50 × 6.50 | Bottom Contact | SD-78499-001 | LDS-MID | PCB | 8.00 × 8.00 × 5.80 | 6.50 × 6.50 × 5.55 | 4.8 × 5.7 | 3.0 × 3.0 | 0.100-0.250 |
| FIG. 5D | 6.50 × 6.50 | Side Contact | SD-47586-001 | LCP | Ceramic | 8.60 × 8.60 × 5.00 | 6.50 × 6.50 × 4.75 | 4.4 × 5.3 | 3.0 × 3.0 | 0.250 |
| FIG. 5E | 8.50 × 8.50 | Side Contact | SD-47337-001 | LCP | Ceramic | 10.60 × 10.60 × 5.00 | 8.50 × 8.50 × 4.75 | 5.5 × 5.5 | 4.0 × 4.0 | 0.400 |

Figure 5F:
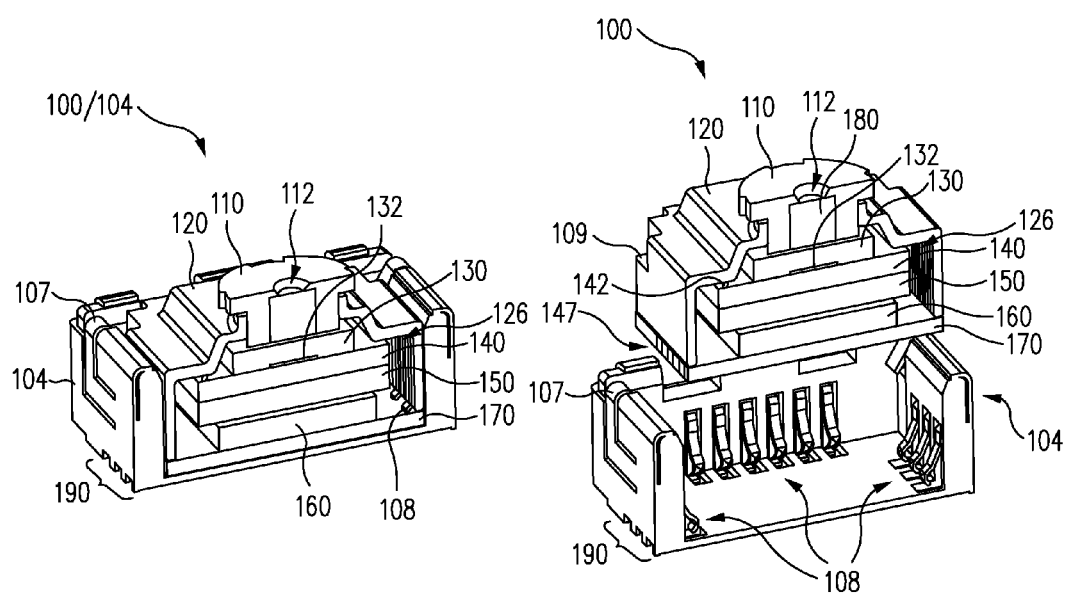
Figure 5G:
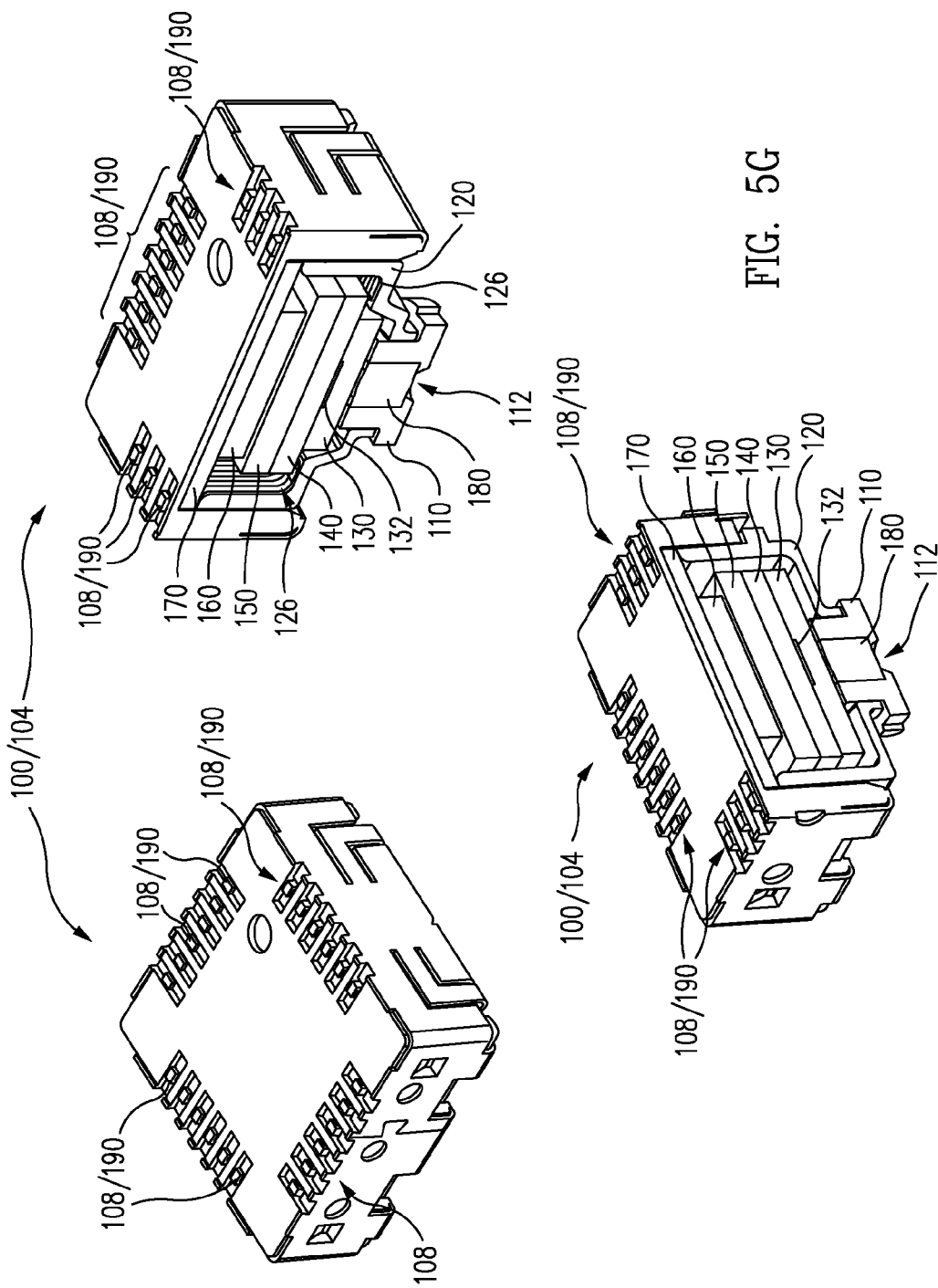
Figure 5H:
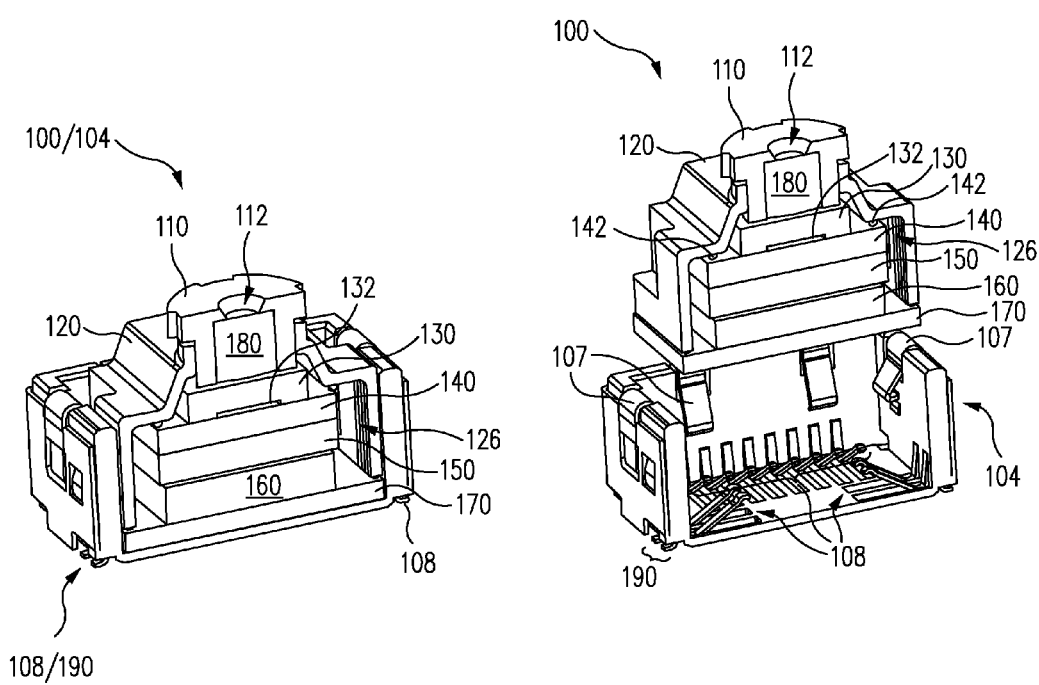
Figure 5I:
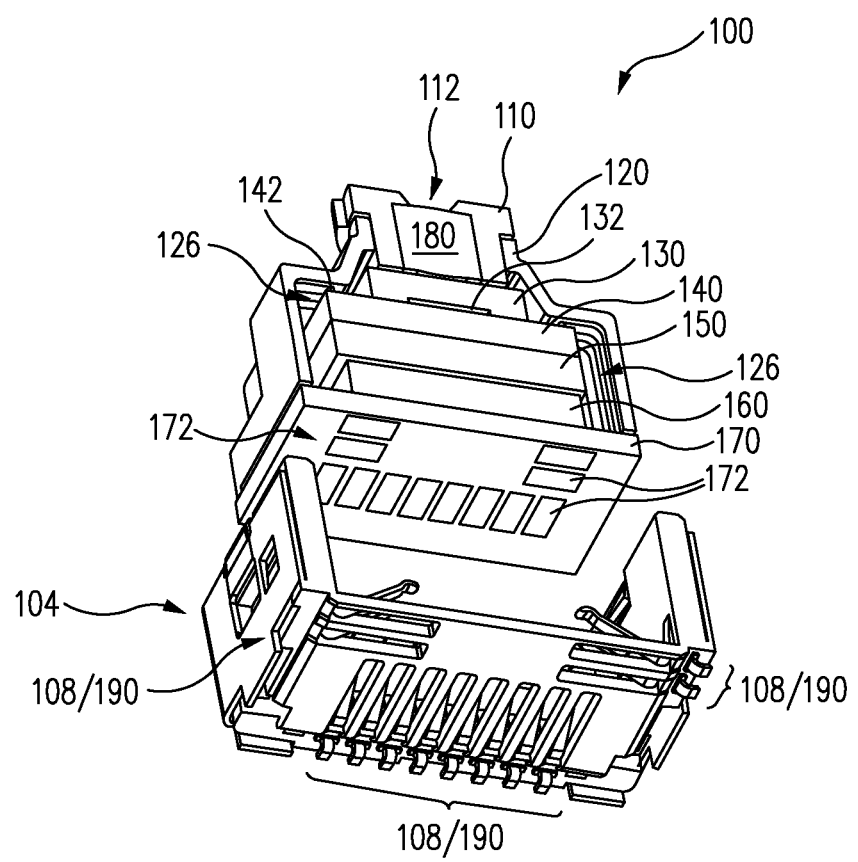
Figure 5J:
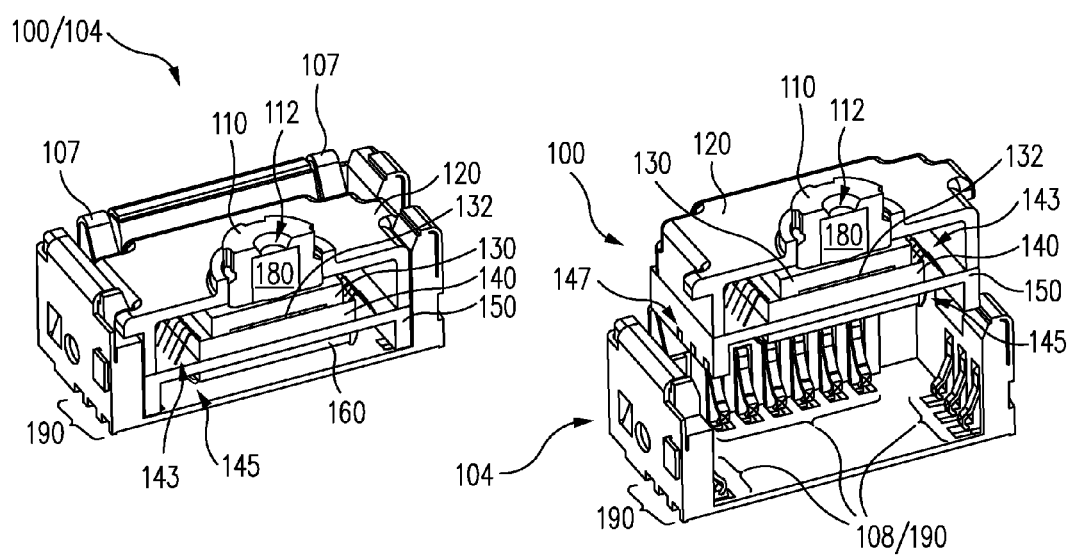
Figure 5K:
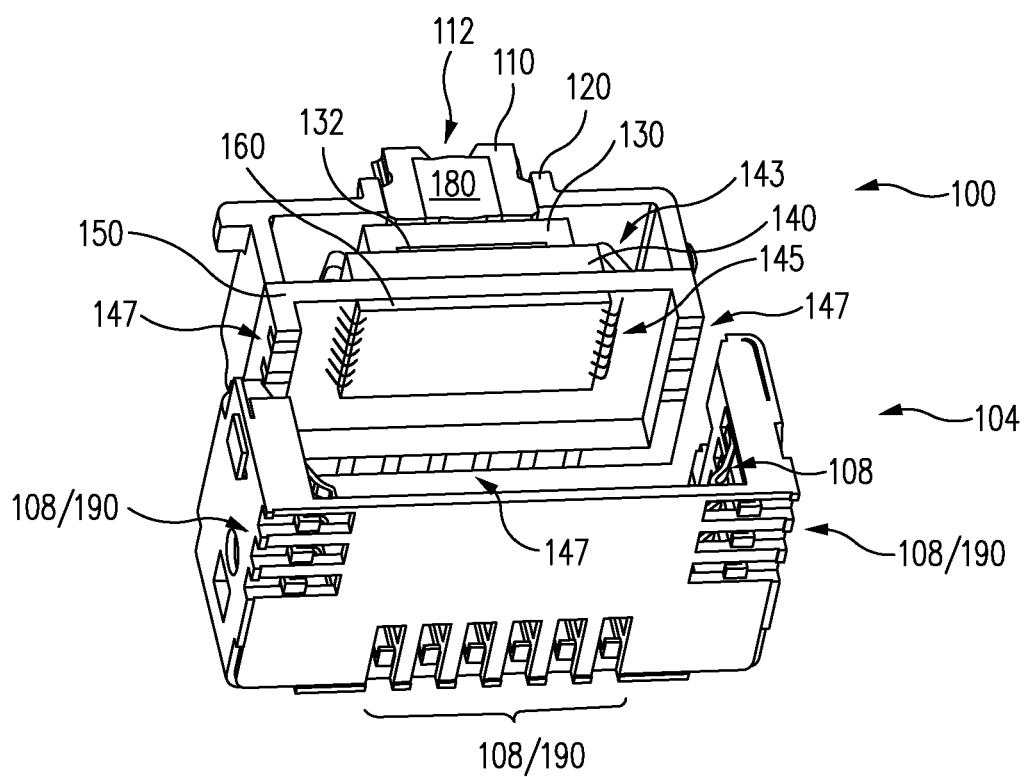
Figure 5L:
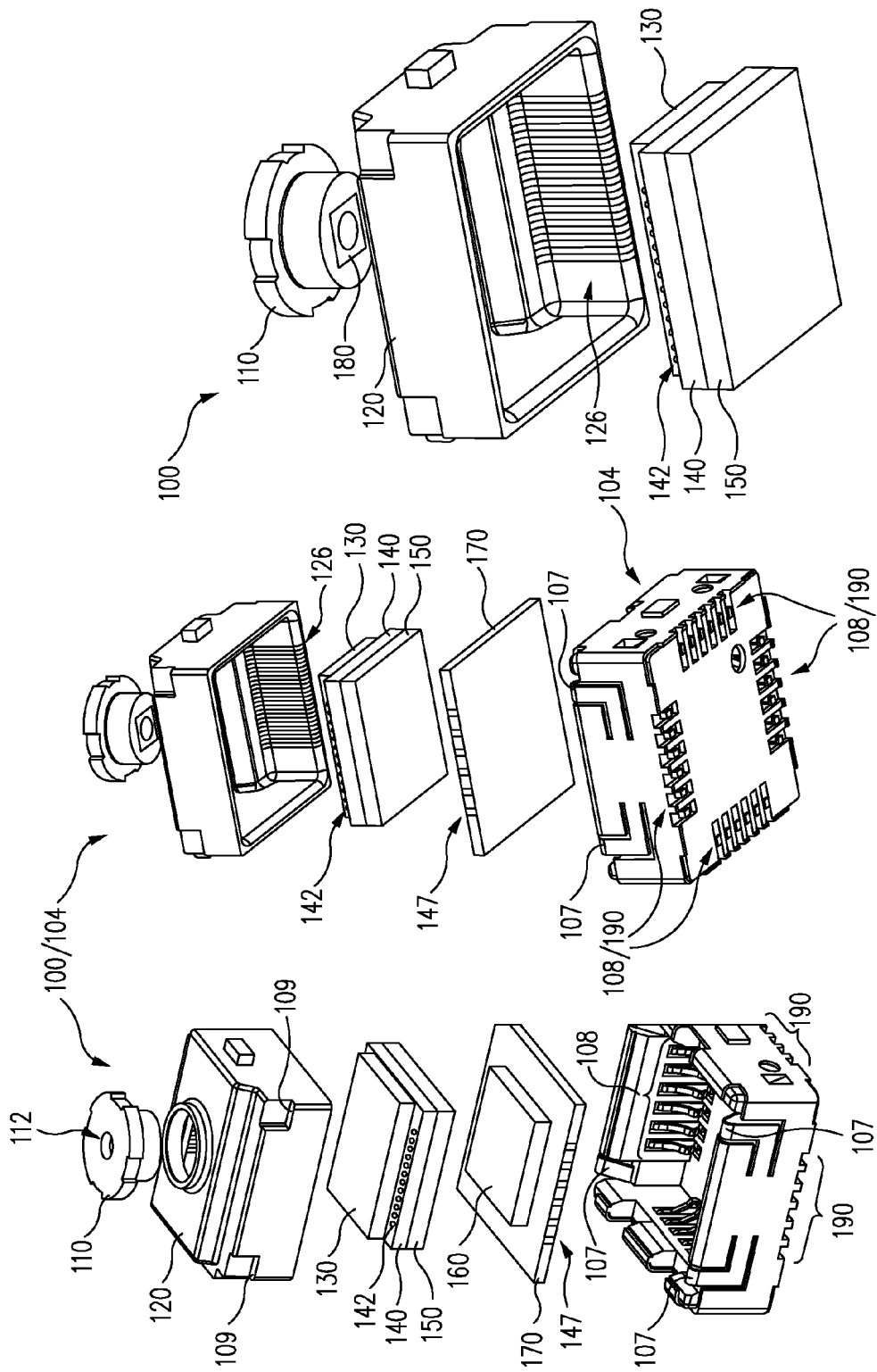
Figure 5M:
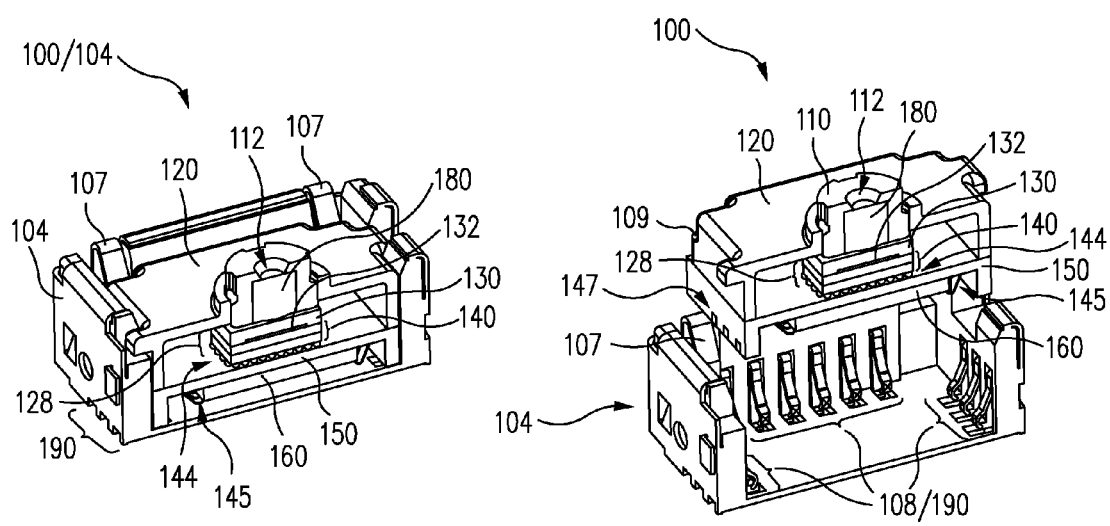
Figure 5N:
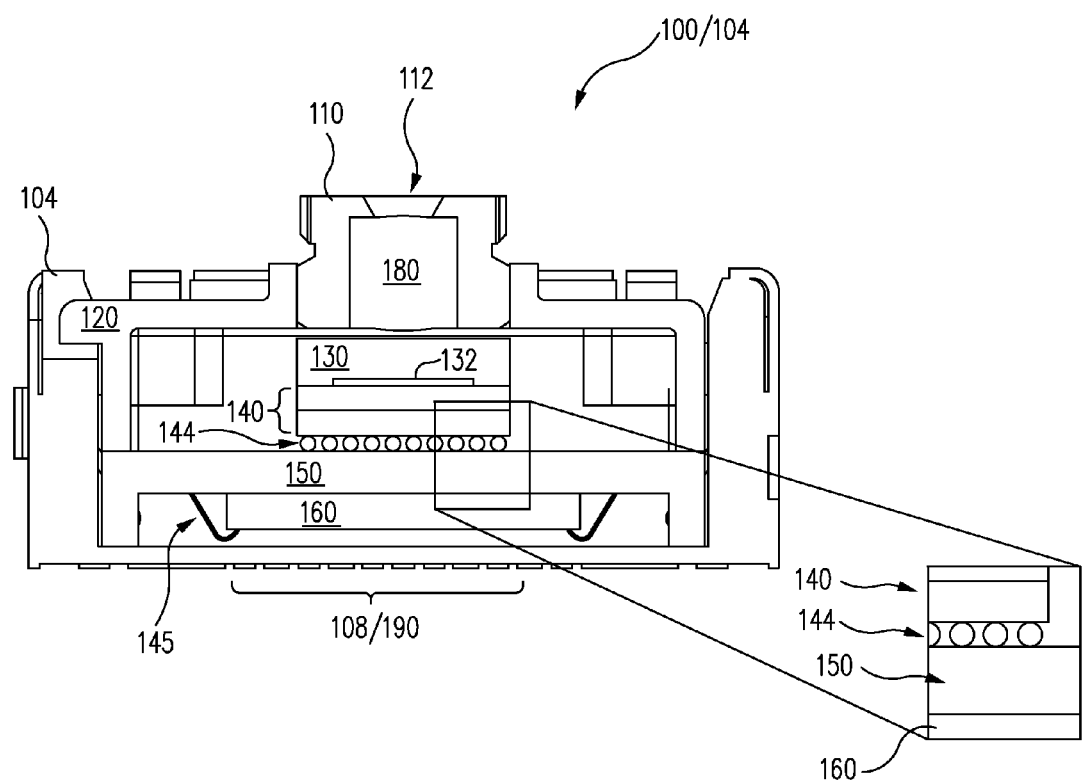
Figure 50:
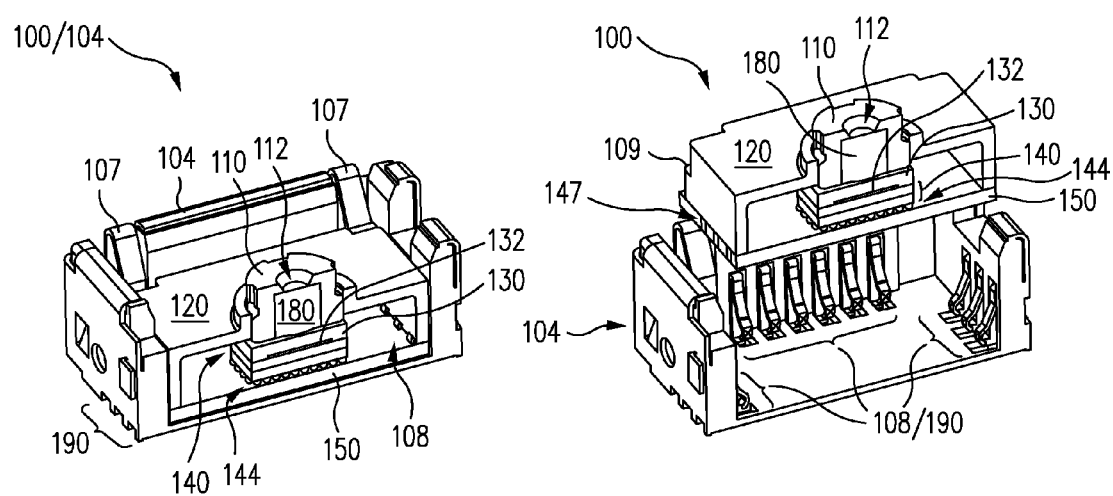
Figure 5P:
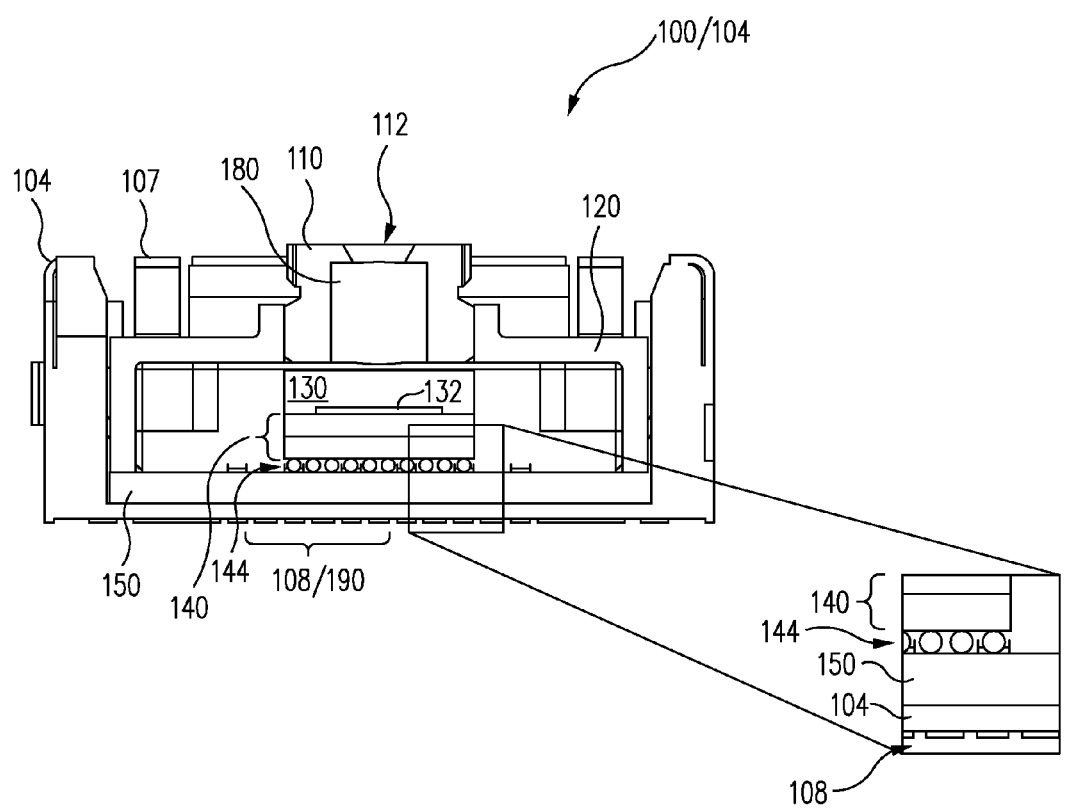

FIGS. 5F-P illustrate additional views of infrared imaging module 100 implemented with several form factors in accordance with various embodiments of the disclosure. For example, FIG. 5F illustrates an embodiment of infrared imaging module 100 similar to FIG. 5A. In FIG. 5F, electrical connections 126 are shown on an inside surface of housing 120. In addition, electrical connections 108 are depicted in a contrasting color for further clarity. Also, electrical connections 147 are shown on side surfaces of circuit board 170 which may connect to electrical connections 108.

FIG. 5G illustrates an embodiment of infrared imaging module 100 similar to FIG. 5A with electrical connections 108 depicted in a contrasting color for further clarity on a bottom surface of socket 104 which may be used to interface with appropriate connections of host device 102.

FIG. 5H illustrates an embodiment of infrared imaging module 100 similar to FIG. 5C. In FIG. 5H, electrical connections 126 are shown on an inside surface of housing 120. In addition, electrical connections 108 are depicted in a contrasting color for further clarity.

FIG. 5I illustrates an embodiment of infrared imaging module 100 that provides another view of the embodiment shown in FIG. 5H. In FIG. 5I, contacts 172 are shown on a bottom surface of circuit board 170 which may contact electrical connections 108 when infrared imaging module 100 is inserted into socket 104. Accordingly, it will be appreciated that the various components of infrared imaging module 100 may be electrically connected to host device 102 through contacts 172 and electrical connections 108.

FIG. 5J illustrates an embodiment of infrared imaging module 100 similar to FIG. 5O and with socket 104 similar to that illustrated in FIG. 5E. In FIG. 5J, electrical connections 108 are depicted in a contrasting color for further clarity. Also, electrical connections 147 are shown on side surfaces of circuit board 170 which may connect to electrical connections 108.

FIG. 5K illustrates an embodiment of infrared imaging module 100 that provides another view of the embodiment shown in FIG. 5J. In FIG. 5K, electrical connections 147 are further shown on bottom surfaces of circuit board 170 which may connect with appropriate electrical connections 108.

FIG. 5L illustrates several embodiments of infrared imaging module 100 in exploded views. For example, in FIG. 5L, electrical connections 126 are shown on an inside surface of housing 120. Also, electrical connections 147 are shown on side surfaces of circuit board 170 which may connect to electrical connections 108. In addition, electrical connections 108 are depicted in a contrasting color for further clarity inside socket and also on a bottom surface of socket 104 which may be used to interface with infrared imaging module 100 and host device 102.

FIG. 5M illustrates an embodiment of infrared imaging module 100 implemented with various components of infrared sensor assembly 128 (e.g., cap 130 and substrate 140) having a substantially uniform width. In one embodiment, such an implementation may permit the various components of infrared sensor assembly 128 to be singulated together during manufacture. In FIG. 5M, substrate 140 may be implemented with a split (e.g., multi-layer) implementation with the ROIC provided on one or both layers and connected to other circuitry of substrate 140 through the layers (e.g., through appropriate silicon vias or other connections). As also shown in FIG. 5M, substrate 140 may be connected to base 150 through solder balls 144 (e.g., to implement flip chip mounting), and processing module 160 may be connected to base 150 through wire bonds 145. FIG. 5N illustrates an embodiment of infrared imaging module 100 that provides another view of the embodiment shown in FIG. 5M.

FIG. 5O illustrates an embodiment of infrared imaging module 100 with infrared sensor assembly 128 implemented in a similar fashion as FIGS. 5M-N. In FIG. 5O, processing module 160 may be integrated as part of substrate 140.

FIG. 5P illustrates an embodiment of infrared imaging module 100 that provides another view of the embodiment shown in FIG. 5O. FIG. 5P further illustrates electrical connections 108 on a bottom surface of socket 104.

Additional implementations of infrared imaging modules 100 are also contemplated. For example, FIGS. 6-8 illustrate infrared imaging modules 100 implemented with several topologies in accordance with various embodiments of the disclosure.

Figure 6:
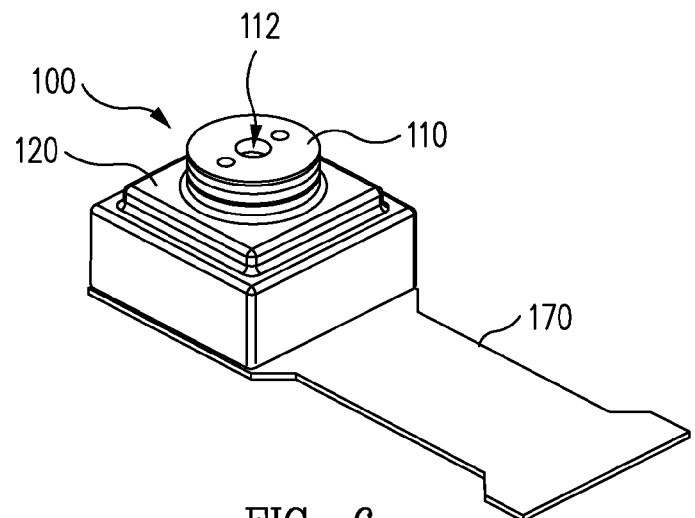
FIGS. 6-8 illustrate infrared imaging modules implemented with several topologies in accordance with various embodiments of the disclosure.

For example, FIG. 6 illustrates infrared imaging module 100 after encapsulation. FIG. 7 illustrates infrared imaging module 100 with processing module 160 mounted on circuit board 170 and external to housing 120 to provide a lower overall profile for imaging module 100.

Figure 7:
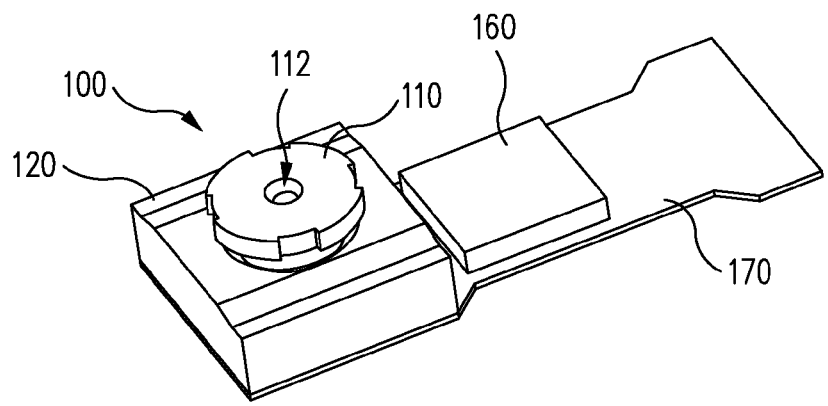
Figure 8:
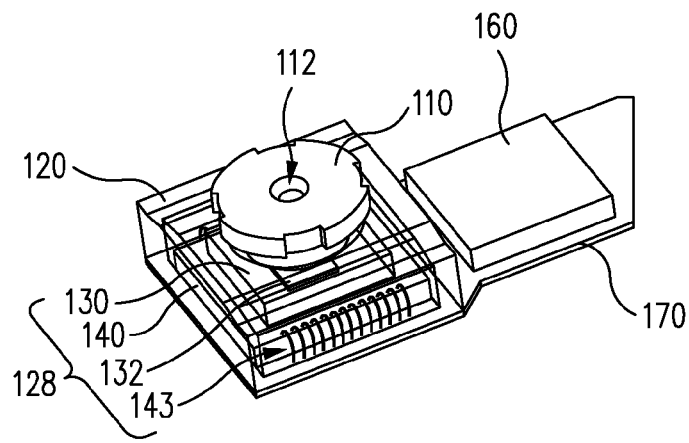

FIG. 8 illustrates infrared imaging module 100 of FIG. 7 with housing 120 shown transparent for purposes of illustrating examples of cap 130, an array of infrared sensors 132, and wire bonds 143. As shown in FIG. 8, various components of infrared sensor assembly 128 may be connected to circuit board 170 through wire bonds 143.

Figure 9:
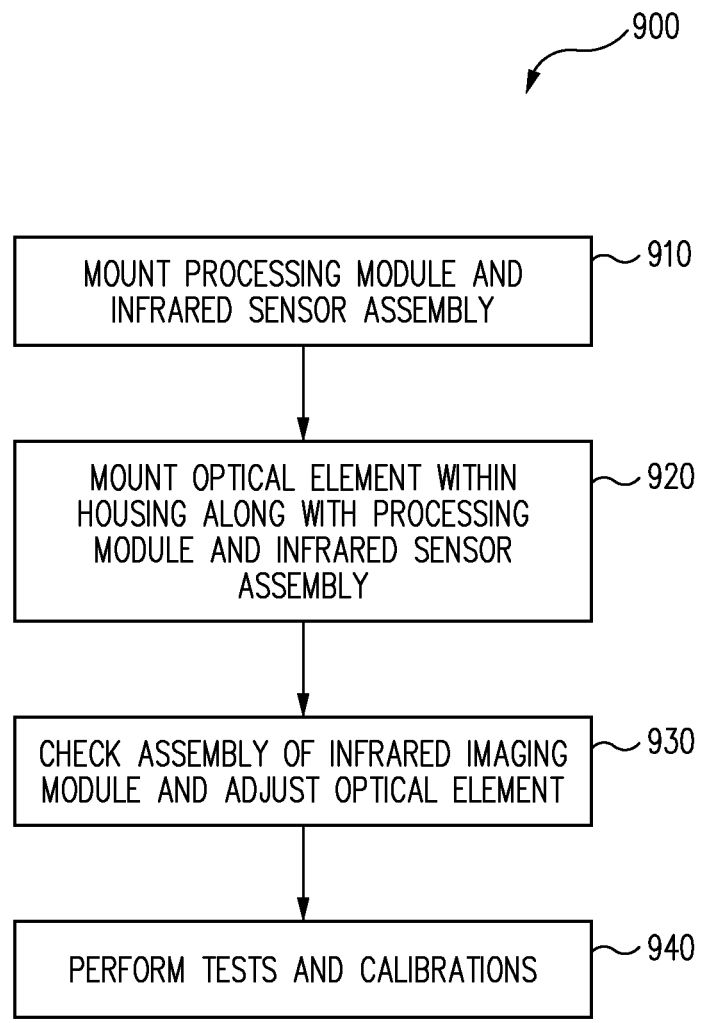
FIG. 9 illustrates a process of manufacturing an infrared imaging module in accordance with an embodiment of the disclosure.

FIG. 9 illustrates a process 900 of manufacturing infrared imaging module 100 in accordance with an embodiment of the disclosure. At block 910, processing module 160 and infrared sensor assembly 128 may be mounted in accordance with the various embodiments described herein.

At block 920, optical element 180 may be mounted within housing 120 along with processing module 160 and infrared sensor assembly 128. For example, in one embodiment, optical element 180 may be provided in lens barrel 110 that is inserted into aperture 122 of housing 120. Also at block 920, the various components may be positioned such that housing 120 encloses processing module 160 and infrared sensor assembly 128 in accordance with the various embodiments described herein.

For example, in some embodiments, housing 120 may be brought into contact with bond pads 142 and circuit board 170 such that bond pads 142 contact electrical connections 126 of housing 120, and connections 124 protruding from the bottom surface of housing 120 connect with complementary connections of circuit board 170. In other embodiments, housing 120 may be brought into contact with base 150.

At block 930, the assembled infrared imaging module 100 may be checked (e.g., for proper assembly, tolerances, or other parameters). Also at block 930, optical element 190 may be adjusted (e.g., focused). For example, lens barrel 110 may be threaded to engage complementary threads on inside surfaces within aperture 122 of housing 120. In this regard, lens barrel 110 may be screwed in or out to adjust the position of lens barrel 110 relative to infrared sensor assembly 128. After such adjustment, lens barrel 110 may be secured using, for example, appropriate adhesives (e.g., glue) or other techniques.

At block 940, infrared imaging module 100 may be tested and calibrated in accordance with various testing and calibrating techniques further described herein.

Figure 10:
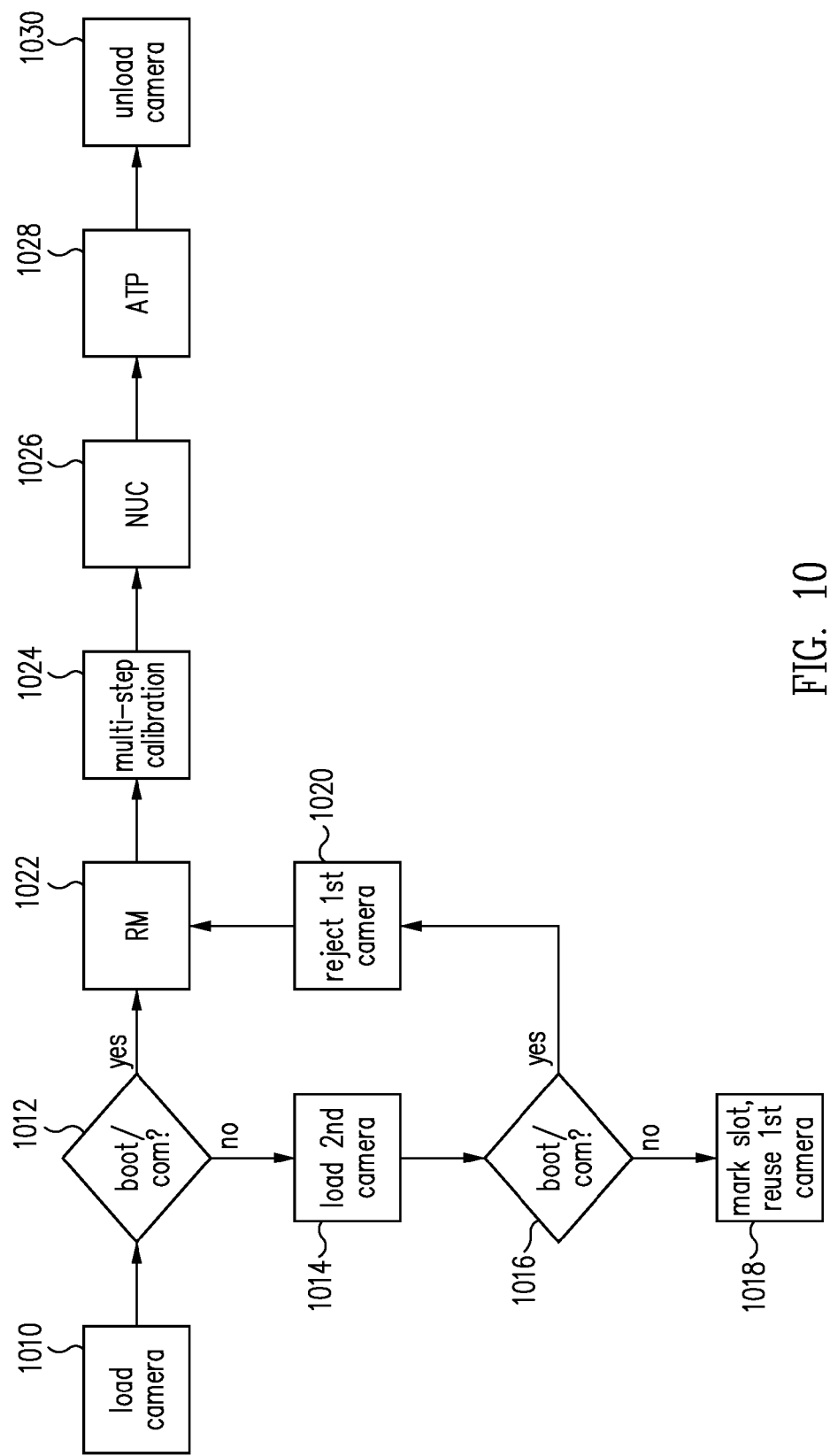
FIG. 10 illustrates a process of testing and calibrating an infrared imaging module in accordance with an embodiment of the disclosure.

FIG. 10 illustrates a process of testing and calibrating an infrared imaging module 100 in accordance with an embodiment of the disclosure. In one embodiment, the process of FIG. 10 may be performed at block 940 of FIG. 9.

At block 1010, a first infrared imaging module 100 (e.g., referred to as a camera in this embodiment) is loaded into a calibration socket (e.g., also referred to as a slot) which may be used to emulate the physical connections and operation of socket 104. By using such calibration sockets (or actual sockets 104) during the process of FIG. 10, test equipment induced yield losses may be reduced, and malfunctioning calibration sockets may be flagged for maintenance as appropriate (e.g., at block 1018 as further described herein). In another embodiment, the actual socket 104 to be used with infrared imaging module 100 may be used in place of a calibration socket.

At block 1012, a first boot and communication test is performed on the first infrared imaging module 100 to determine if processing module 160 properly boots up and if communications can be successfully made over electrical connections between the calibration socket and the first infrared imaging module 100. If the test of block 1012 is successful, then the process continues to block 1022. Otherwise, the process continues to block 1014.

At block 1014, a second infrared imaging module 100 (e.g., also referred to as a camera in this embodiment) is loaded into the calibration socket in place of the first infrared imaging module 100.

At block 1016, a second boot and communication test is performed on the second infrared imaging module 100 as discussed with regard to block 1012. If the test of block 1012 is successful, then the process continues to block 1020. Otherwise, the process continues to block 1018.

At block 1018, after the first and second boot and communication tests of blocks 1012 and 1016 have failed, it is assumed that the calibration socket is defective and it is marked accordingly (e.g., flagged for maintenance). The first infrared imaging module 100 may be reused in another iteration of block 1010 if desired.

At block 1020, after the first boot and communication test of block 1012 has failed using the first infrared imaging module 100, and after the second boot and communication test of block 1012 has passed using the second infrared imaging module 100, it is assumed that the first infrared imaging module 100 is defective and it is discarded or further reviewed and tested for possible corrective measures.

At block 1022, an on-chip calibration may be performed (e.g., identified as RM) on the infrared imaging module 100 loaded in the calibration socket. At block 1024, a multi-step calibration test is performed on infrared imaging module 100. In this regard, infrared imaging module 100 may be subjected to various temperatures in different temperature controlled environments (e.g., zones) to calibrate, as would be understood by one skilled in the art, and as further described in relation to FIGS. 11 and 12 for one or more embodiments.

At block 1026, non-uniform correction (NUC) values and/or other appropriate values are determined and/or stored for each infrared sensor 132 of infrared sensor assembly 128 of infrared imaging module 100 based on measurements (e.g., calibration data) obtained at block 1024.

At block 1028, an acceptance test procedure (ATP) is performed on infrared imaging module 100 using the NUC values and/or other values determined at block 1026. For example, ATP testing may be performed to verify proper operation and performance specifications are met. At block 1030, infrared imaging module 100 is removed from the calibration socket.

Figure 11:
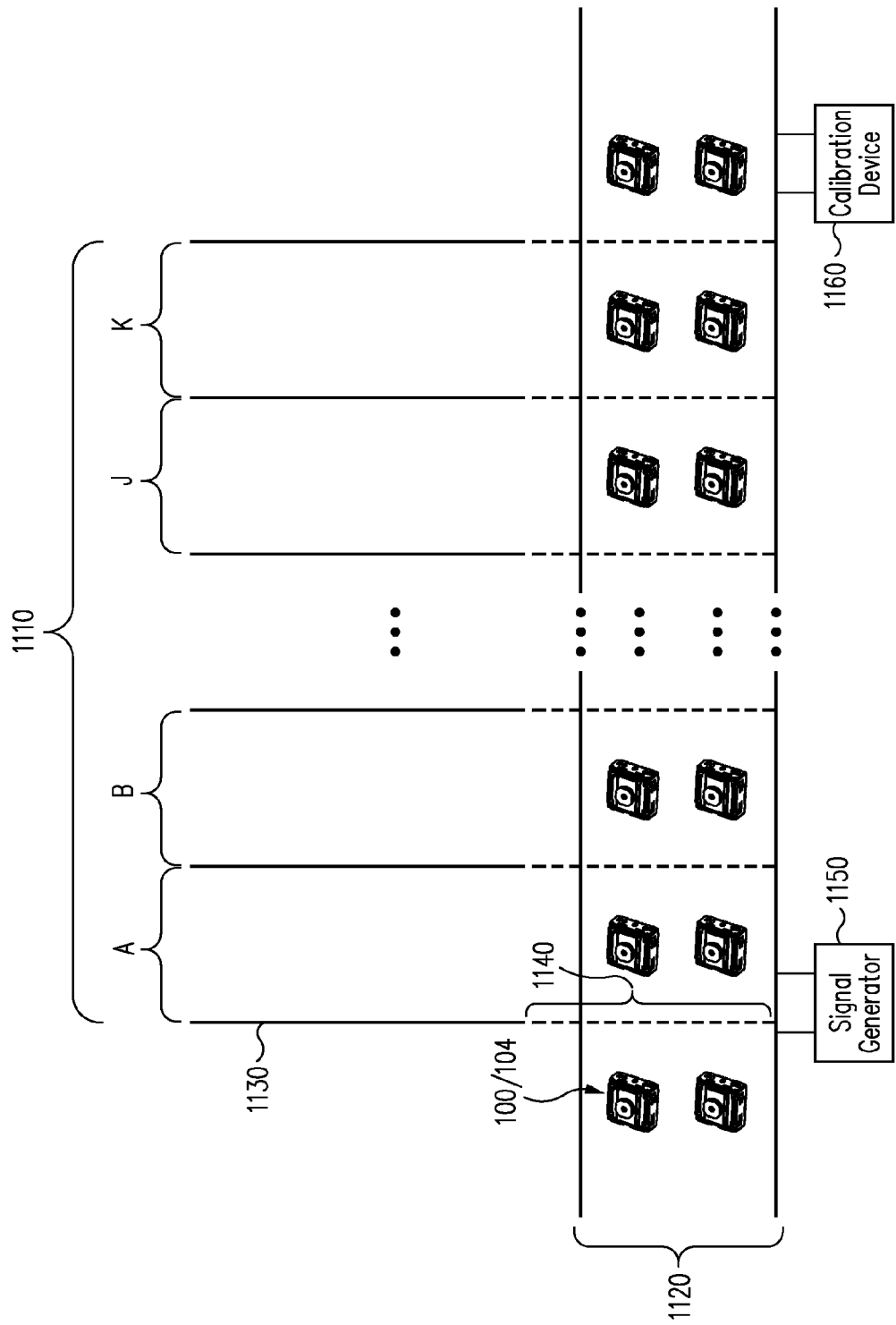
FIG. 11 illustrates an environment used to perform a process of calibrating an infrared imaging module in accordance with an embodiment of the disclosure.
Figure 12:
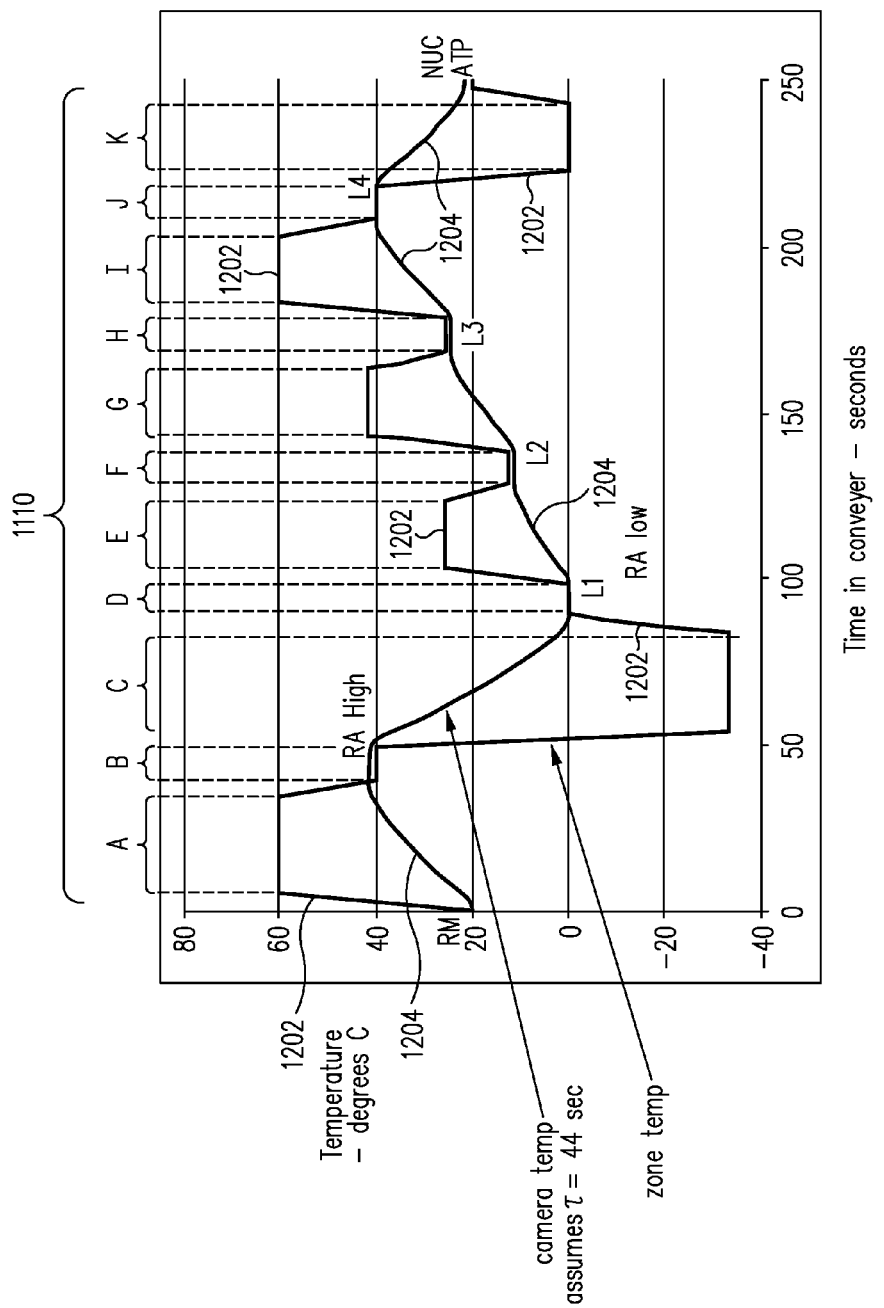
FIG. 12 illustrates temperature plots for a process of calibrating an infrared imaging module in accordance with an embodiment of the disclosure.

FIG. 11 illustrates an environment used to perform a process of calibrating infrared imaging module 100 in accordance with an embodiment of the disclosure, and FIG. 12 illustrates temperature plots 1202 and 1204 for such a calibration process in accordance with an embodiment of the disclosure. In one embodiment, the calibration process of FIGS. 11 and 12 may be performed at block 1024 of FIG. 10 to determine NUC values and/or other values used to calibrate infrared sensors 132 of infrared sensor assembly 128 of infrared imaging module 100.

In the calibration process of FIGS. 11 and 12, a plurality of infrared imaging modules 100 may be positioned in corresponding calibration sockets or actual sockets 104 and carried on a conveyor 1120 (e.g., a conveyor belt or other appropriate transport mechanism) through a plurality of different temperature controlled environments 1110. In this regard, different environments 1110 may be substantially separated, for example, by a plurality of partitions 1130 which may be configured with appropriate structures 1140 such as doors, apertures, or other appropriate partitions to pass infrared imaging modules 100 therethrough. Although eleven example environments 1110A-K are identified in FIGS. 11 and 12, any desired number of environments may be used in other embodiments.

As shown in FIG. 11, in one embodiment, two infrared imaging modules 100 may be tested at a time in each environment 1110. Other numbers of infrared imaging modules 100 may be tested in other embodiments. In one embodiment, test signals may be provided by test equipment (e.g., signal generators) 1150 (e.g., implemented with any appropriate logic, processors, memories, circuitry, software instructions, and/or other appropriate components) to infrared imaging modules 100 through appropriate electrical connections in sockets 104 to cause infrared sensors 130 of infrared imaging modules 100 to perform one or more measurements while in each environment 1110.

In FIG. 12, temperature plot 1202 identifies the ambient temperature in each of environments 1110. Also in FIG. 12, temperature plot 1204 identifies the temperature of infrared imaging module 100 as it passes through environments 1110.

By performing test measurements of each infrared sensor 132 of infrared sensor assembly 128 of each infrared imaging module 100 under different temperatures in various environments 1110, appropriate NUC values and/or other values may be determined and stored (e.g., at block 1026 of FIG. 10) to calibrate the infrared sensors 132. In one embodiment, such NUC values and/or other values may be determined by one or more calibration devices 1160 (e.g., implemented with any appropriate logic, processors, memories, circuitry, software instructions, and/or other appropriate components) and/or infrared imaging modules 100 themselves. Alternatively, calibration devices 1160 may be implemented within test equipment 1150.

Moreover, by moving multiple infrared imaging modules 100 through different environments 1110, large numbers of infrared imaging modules 100 may be continuously calibrated to provide, for example, a yield of approximately one per second in one embodiment. In one embodiment, calibration data for each infrared imaging module 100 may be stored in a single table in a memory (e.g., non-volatile memory and/or read-only memory) of the associated processing module 160 or other appropriate component of each infrared imaging module 100. For example, in one embodiment, if infrared imaging modules 100 are operated with relatively low resolution arrays of infrared detectors 132 and over a relatively small temperature range (e.g., approximately an 80 degree C. range), then, such calibration data may be provided in a single table data structure.

As shown in FIG. 12, the temperature of infrared imaging module 100 (denoted by temperature plot 1204) may slew in an exponential manner in response to the ambient temperature (denoted by temperature plot 1202). In this regard, the temperatures of at least some of environments 1110 may be maintained at temperatures that are higher (e.g., environments 1110A, 1110E, 1110G, and 1110I) or lower (e.g., environments 1110C and 1110K) than the actual temperatures sought to be tested for infrared imaging module 100 in order to cause the temperature of infrared imaging module 100 to rapidly increase or decrease. In one embodiment, infrared imaging module 100 may be maintained in environments 1110A, 1110O, 1110E, 1110G, 1110I, and 1110K for time periods approximately equal to two thirds of a thermal time constant associated with infrared imaging module 100. In one embodiment, the thermal time constant may be approximately equal to 44 seconds. As also shown in FIG. 12, while in environment 1110E, another on-chip calibration may be performed (e.g., identified as RA) on infrared imaging module 100.

In view of FIG. 12, it will be appreciated that infrared imaging module 100 may quickly transition to a desired temperature for measurement purposes (e.g., for measurement at various stepped temperatures in environments 1110B, 1110D, 1110F, 1110H, and 1110J). Accordingly, in some embodiments, measurements may be taken in only some of environments 1110. In other embodiments, measurements may be taken in all of environments 1110.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method of calibrating an infrared imaging module, the method comprising:
   providing a plurality of temperature controlled environments;
   inserting the infrared imaging module into a socket;
   transporting the infrared imaging module through the environments;
   performing measurements in each environment using a plurality of infrared sensors of the infrared imaging module to receive infrared radiation associated with each environment; and
   determining a plurality of calibration values for the infrared imaging module based on the measurements, wherein each infrared sensor has an associated calibration value for each of the environments.

2. The method of claim 1, wherein the transporting comprises continuously transporting the infrared imaging module through the environments.

3. The method of claim 1, further comprising storing the calibration values in a single table.

4. The method of claim 1, wherein the performing measurements further comprises providing test signals to the infrared imaging module through the socket.

5. The method of claim 1, wherein the calibration values include non-uniformity correction (NUC) values.

6. The method of claim 1, wherein each temperature controlled environment exhibits a corresponding ambient temperature greater than or less than an associated measurement temperature of the infrared imaging module to slew a current temperature of the infrared imaging module to the associated measurement temperature.

7. The method of claim 1, wherein the infrared imaging module is maintained in the environments for time periods approximately equal to two thirds of a thermal time constant associated with the infrared imaging module.

8. An apparatus comprising:
   a plurality of partitions adapted to substantially separate a plurality of temperature controlled environments;
   a conveyor adapted to receive a plurality of infrared imaging modules and transport the infrared imaging modules through the environments; and a test equipment adapted to provide a plurality of test signals to the infrared imaging modules to cause a plurality of infrared sensors of each infrared imaging module to perform at least one measurement in each environment are response to infrared radiation received in each environment, wherein the measurements are adapted to be used to provide at least one calibration value for each infrared sensor of each infrared imaging module for each of the environments.

9. The apparatus of claim 8, further comprising a plurality of sockets adapted to receive the infrared imaging modules on the conveyor.

10. The apparatus of claim 9, wherein the test equipment is adapted to provide the test signals to the infrared imaging modules through the sockets.

11. The apparatus of claim 8, wherein each infrared imaging module is adapted to store its associated calibration values in a single table.

12. The apparatus of claim 8, wherein the infrared imaging modules are adapted to determine the calibration values based on the measurements.

13. The apparatus of claim 8, further comprising a calibration device adapted to determine the calibration values based on the measurements.

14. The apparatus of claim 8, wherein the conveyor is adapted to continuously transport the infrared imaging modules through the environments.

15. The apparatus of claim 8, wherein the calibration values are non-uniformity correction (NUC) values.

16. The apparatus of claim 8, wherein each temperature controlled environment exhibits a corresponding ambient temperature greater than or less than an associated measurement temperature of the infrared imaging modules to slew current temperatures of the infrared imaging modules to the associated measurement temperature.

17. The apparatus of claim 8, wherein the infrared imaging modules are maintained in the environments for time periods approximately equal to two thirds of a thermal time constant associated with the infrared imaging modules.

* * * * *